United States Patent [19]

Asakawa

[11] 3,876,431

[45] Apr. 8, 1975

[54] PHOTOSENSITIVE COMPOSITION CONTAINING A N-VINYL AMINE, AN ARYL AMINE AND A METAL COMPOUND PHOTOACTIVATOR

[75] Inventor: Shirow Asakawa, Kawasaki, Japan

[73] Assignee: Matsushita Electric Industrial Company, Limited, Kadoma, Osaka, Japan

[22] Filed: May 24, 1973

[21] Appl. No.: 363,398

[30] Foreign Application Priority Data

May 30, 1972 Japan ............................... 47-53977

[52] U.S. Cl. .................. 96/90 R; 96/88; 96/115 P; 96/94 R; 96/27 R; 96/48 HD

[51] Int. Cl. ............................................. G03c 1/52

[58] Field of Search ... 96/90 R, 48 HD, 48 R, 50 R, 96/27 R, 88, 115 P, 94 R

[56] References Cited

UNITED STATES PATENTS

| | | | |
|---|---|---|---|
| 3,418,128 | 12/1968 | Huett | 96/90 R |
| 3,544,322 | 12/1970 | Yamada | 96/90 R |
| 3,607,266 | 9/1971 | Yamada et al. | 96/48 R |
| 3,615,563 | 10/1971 | Chalkley | 96/90 R |
| 3,667,949 | 6/1972 | Inoue et al. | 96/48 R |
| 3,697,276 | 10/1972 | Lewis et al. | 96/90 R |

*Primary Examiner*—Norman G. Torchin
*Assistant Examiner*—Won H. Louie, Jr.

[57] ABSTRACT

A first compound of an enamine, a second compound of an aromatic amine and a third compound which decomposes upon exposure to actinic radiation liberating acidic material are dissolved in an agent and stirred at a high speed to provide a photosensitive emulsion. The emulsion is applied onto a sheet of substrate paper and solidified in a dark drying chamber. The photosensitive-layer coated paper is subjected to an imagewise actinic radiation having a wavelength shorter than 4,500 A and then to a second exposure to a radiation having a wavelength longer than 5,400 A and to heat at a temperature of about 80° to 120°C.

4 Claims, No Drawings

PHOTOSENSITIVE COMPOSITION CONTAINING A N-VINYL AMINE, AN ARYL AMINE AND A METAL COMPOUND PHOTOACTIVATOR

The present invention relates generally to photosensitive compositions for use with dry-working photography. More particularly, it relates to photosensitive compositions comprising an enamine compound, an aromatic amine compound and a compound which decomposes to liberate acidic material when exposed to light.

Photosensitive compositions containing organic halogen compounds and N-vinyl heterocyclic compounds which form dyes upon exposure to light have been described in U.S. Pat. Nos. 3,476,562 and 3,607,266 issued to Y. Yamada. He uses N-vinyl carbazole, carbon tetrabromide, water and gelatin, and stirs them until the halogen and N-vinyl compounds are dispersed in discrete particle form. The solution is applied on a sheet of baryta paper to form a photosensitive film thereon. The solvent is then removed by drying the film in the ambient atmosphere. The film is subjected to an "imagewise exposure" to radiation in the wavelength range of 4,000 to 7,800 A and then subjected to a second exposure to near ultraviolet light in the range of 3,000 to 4,000 A. The light-exposed film is subsequently subjected to heat at a temperature of about 70°C producing bluish green images. In the conventional dry working process, the presence of an organic halogen compound such as carbon tetrabromide is considered as playing an important role in the formation of a dye. It is generally recognized that dyes are formed as a result of a reaction between the residue of organic halogen compound and amine compound (Photographic Science and Engineering, Vol. 5, No. 2, Pages 98 to 103).

Although this prior art dry working process has its advantages, it involves the use of materials which emit unpleasant odors, are chemically instable and harmful which demands users of the utmost care in handling.

Accordingly, it is an object of the present invention to provide an improved photosensitive composition which emits no unpleasant odors, is chemically stable and not harmful.

In brief, the present invention contemplates the use of (1) an enamine compound, (2) an aromatic amine compound and (3) a compound which decomposes to liberate acidic material when exposed to light. In more detail, the present invention is based on a principle that an acidic material liberated upon exposure to light serves to hydrolyze the enamine compound. This involves transformation of double bonds into aldehyde. The aldehyde condensates with the aromatic amine under adequate thermal and acidic conditions to form a dye. Therefore, the present invention eliminates the use of organic halogen compound which has been used in the practice of the prior art dry working process. The elimination of organic halogen compound has resulted in complete elimination of the inherent disadvantages as described above.

The enamine compound employed in the practice of the invention is an N-vinyl compound having the following structural unit:

The enamine compound include N-vinylindole, N-vinylpyrrole, N-vinylcarbazole, N-vinyl-α-naphthylamine, N-vinyldiphenylamine, N-vinylpyrrolidone, N-vinyloxazolidone, N-vinylsuccinimide, N-vinylimidazole, N-vinyloxazole, N-vinyloxindol, N-vinylpyrrolidine, N-vinylmorpholine, and N-vinylpiperidine. The double bond of these enamines is capable of polymerization reaction as well as hydrolysis reaction simultaneously. Which reaction will take place depends on the acidity or basicity of the system and the stability of counter ions. Hence, the compounds used for liberating acidic material and their quantity in the solution determine which reaction to take place and, thus photosensitivity can be controlled at a desired value.

The aromatic amine employed in the practice of the invention is those used in the prior art dry working process including, for example, diphenylamine, N-alkyldiphenylamine (N-methyldiphenylamine and N-ethyldipenylamine), aniline, N-alkylaniline (N-methylaniline, N-ethylaniline, etc.) and N N dialkylaniline, Naphthylamine, toluidine, and triphenylamine, etc. In addition to these, the N-hetero aromatic compound, such as carbazole and ethylcarbazole may also be used.

The compound which decomposes when exposed to light liberating acidic material is a halogenide of an oxidizing metal or a perchlorate of an oxidizing metal, such as, for example, copper bromide ($CuBr_2$), silver bromide (AgBr), sodium aurichloride ($NaAuCl_4$), sodium auribromide ($NaAuBr_4$), copper perchlorate ($Cu(Clo_4)_2$), silver perchlorate ($AgClO_4$) and zinc phenolsulfonate ($Zn(C_6H_5SO_3)_2$), etc. It is to be understood that the present invention is not limited to these compounds but include those that are capable of rendering the composition acidic upon exposure to light.

Also, it is to be noted that the photosensitive composition according to the invention may be essentially comprised of an enamine and an acidic-material liberating compound if the enamine is one which acts as an aromatic amine as well as a source of aldehyde.

In a preferred embodiment of the invention, the photosensitive composition comprising the above-stated three elements is mixed with a binder, i.e., water-soluble natural high polymer (e.g., gelatin) or a conventional film-forming synthetic resin and stirred at a high speed to provide a dispersed solution. A sheet of baryta paper is coated with the solution to form a photosensitive layer and then placed in a dark drying chamber. The photosensitive film is subjected to an "imagewise exposure" by being exposed to the projection of an image of a negative or positive color transparency. Such an image is projected by a conventional light source which may be a xenon lamp or a tungsten lamp having a wavelength shorter than 4,500 A or to an actinic radiation such as electron beam. The film is preferably subjected to a second exposure to red light from a light source providing radiation of wavelengths longer than 5,400 A. The film is then subjected to heat at a temperature of about 80° to 120°C. A latent image is formed by the imagewise exposure and the image is developed by the heating. The photosensitive composition in accordance with the present invention thus allows images to be formed by a dry working process without emitting objectionable oders.

In a still preferred embodiment of the invention, the concentrations of the several constituents of the photosensitive composition are 45 to 75 percent by weight of an enamine compound, 20 to 50 percent by weight of an aromatic amine compound and up to 50 percent by weight of a compound which decomposes to liberate acidic material upon exposure to light.

The present invention will be further described by way of examples.

EXAMPLE 1

10 g. of refined N-vinylcarbazole (enamine compound), 5 g. of ethylcarbazole (aromatic amine) and 6 mg. of 4-p-dimethylaminostyrylquinoline as a sensitizer were dissolved in 50 ml. of tetrahydrofuran. 5 g. of polyvinyl chloride was added to the solution as a binder. The solution was stirred at a high speed until the ethylcarbazole, N-vinylcarbazole, ethylcarbazole, 4-p-dimethylaminostylrylquinoline and polyvinylchloride were uniformly dissolved. 0.1 g. of sodium aurichloride and 1 ml. of acetone were added to the solution and stirred to obtain a uniform solution. As soon as the solution was obtained, it was applied to a thickness of 80 microns using a doctor blade onto a sheet of baryta paper. The paper sheet with the wet film coating thereon was placed in a dark drying chamber at room temperature for a few hours to obtain a dry solid film. This film was photosensitive having a mild yellow color.

Run 1

The film thus prepared was placed at a distance of 1 meter from a 500 watt exnon lamp (wavelength ranging from 3,000 to 4,500 A) with a positive transparency placed in contact with the film. The film was subjected to an imagewise exposure for 3 seconds and then subjected to heat at a temperature of 120°C for 1 minute. A negative image was thus obtained having a maximum density of 2.0 and a fog density of 0.1.

Run 2

The photosensitive film was subjected to the same imagewise exposure as in Run 1 except that the exposure time was for a period of 10 seconds. A negative image having a maximum density of 1.8 and a fog density of 0.05 was obtained in the absence of a heat treatment.

Run 3

The photosensitive film was subjected to the same imagewise exposure as in Run 1 except that the exposure time was for a period of 1 second. The light-exposed film was then subjected to a red light second exposure using a 100 watt tungsten lamp and an optical filter which eliminates wavelengths below 5,400 A for a period of 5 seconds. The film was heated for a second at a temperature of 120°C. A red-violet image was thus obtained. In this Run, it was shown that exposure time could be reduced to about one-third of that of Run 1.

EXAMPLE 2

15 g. of N-vinylcarbazole, 5 g. of poly-N-vinylcarbazole which also serves as a binder, and 50 ml. of tetrahydrofuran were stirred at a high speed to obtain a uniforml solution. 0.2 g. of sodium auribromide was added to the solution. This solution was applied to a thickness of 80 microns onto a sheet of baryta paper using a doctor blade and placed in a dark drying chamber at room temperature to obtain a solid dry film. The film thus obtained had a mild red-brown color. The film was then subjected to an imagewise exposure for two seconds through a positive transparency to a 500 watt xenon lamp from a distance of 1 meter. The film was heated at 100°C to obtain a dark green negative image.

EXAMPLE 3

5 g. of N-vinylpyrrolidone and 5 g. of N-methyldiphenylamine were dissolved in 100 ml. of water. 20 grams of gelatin was added to the solution which is subsequently stirred at a high speed. After the stirring, 0.2 g. of silver perchlorate was added and agitated to provide a uniform emulsion. The emulsion was applied on a sheet of baryta peper to a thickness of 80 microns and then placed in a dark drying chamber. The solid dry film thus obtained had a mild brown color. The photosensitive film was subjected to an imagewise exposure to a 500 watt xenon lamp from a distance of 1 meter for 2 seconds and then subjected to heat at a temperature of 100°C. The image thus obtained had a dark color and a maximum density of 2.0.

EXAMPLE 4

8 g. of N-vinylimidazole, 5 g. of N-methyl-α-naphthilamine and 5 g. of poly-N-vinylpyrrolidone were dissolved in 100 ml. of water to obtain a dispersed solution. A charge of 0.5 g. of copper bromide was added to the solution to obtain a solution. The solution was applied onto a sheet of polyester film and placed in a dark drying chamber. This resulted in formation of mild green color on the solid photosensitive film. This film was subjected to an imagewise exposure to a 500 watt xenon lamp from a distance of 1 meter for 3 seconds and then heated to 100°C. The image thus obtained had a dark green color.

EXAMPLE 5

5 g. of N-vinylcarbazole, 5 g. of N-methylaniline and 0.5 g. of zinc phenolsulfonate were dissolved into a solution consisting of gelatin 20 g. and water 100 ml. and stirred at a high speed to provide a uniformly dispersed emulsion. The emulsion was applied to a thickness of 80 microns onto a sheet of baryta paper and placed in a dark drying chamber. The film was subjected to an imagewise exposure to a 500 watt xenon lamp for 5 seconds and then heated to a temperature of 100°C for 1 minute. An image of dark brown color was obtained.

EXAMPLE 6

10 g. of N-vinyloxazolidone, 5 g. of ethylcarbazole and 5 g. of polyvinyl alcohol were dissolved into 100 ml. of water and stirred at a high speed to provide a uniformly dispersed solution. Into this solution 0.2 g. of copper perchlorate and 0.01 g. of 4-p-dimethylaminostyrylquinoline was dropped and stirred to obtain a uniformly dispersed emulsion. The emulsion was applied onto a sheet of baryta paper and placed in a dark drying chamber. The photosensitive film so obtained was placed in a vacuum chamber, subjected to a radiation of electron beam at a density of $10^{-3}$ coulomb/cm$^2$ to obtain a latent image, and then to a red light second exposure for 5 seconds and then heated to 100°C. A dark green image was obtained.

EXAMPLE 7

10 g. of N-vinylcarbazole, 5 g. of ethylcarbazole, 0.01 g. of 4-p-dimethylaminostyrylquinoline, 50 ml. of tetrahydrofuran and 5 g. of polyvinylchloride were stirred at a high speed to obtain a uniform solution. 0.1 g. of sodium aurichloride was dropped into the solution and stirred to provide a uniform solution. The solution was applied onto a sheet of baryta paper to a thickness of 80 microns and placed in a dark drying chamber to solidify the wet film.

The photosensitive film was then placed in contact with a fiber-optics faceplate of a television receiver wherein the signal polarity and the direction of scanning electron beam were opposite to those used in conventional television receivers. The viewing screen was of a 2.5 inch type with a phosphor being of the P22-B1 type which has its peak spectral sensitivity in the neighborhood of 4,500 A and a 10 percent glow time of 22 microseconds. The television receiver used in this Example was provided with a special 1-frame gate circuit which was designed to permit the electron beam to scan for a period of a signal frame (1/30 seconds). Pictures received at the television receiver were monitored at a separate viewing screen. While viewing the screen, the 1-frame gate circuit was energized to subject the film to electroluminescent image produced by the scanning electron beam for 1/30 seconds. The image thus formed on the film was subjected to a second exposure to a 100 watt tungsten lamp for 5 seconds through an optical filter which cuts off wavelengths below 5400 A. The image-produced film was then heated to 120°C for 1 minute. A dark red television image was developed on the film.

What is claimed is:

1. A photosensitive composition for dry working process, containing: an enamine compound having the structural unit $$CH_2{=}CH{-}N\langle \;;$$

an aryl amine selected from the group consisting of a diphenylamine, an aniline, a naphthylamine, triphenylamine, an unsubstituted carbazole and ethylcarbazole; up to 50 percent by weight of a compound capable of liberating an acidic substance upon exposure to actinic light selected from the group consisting of halogenides, perchlorates and sulfonates of gold, silver, copper and zinc, said composition being dispersed in a binder.

2. A photosensitive composition as claimed in claim 1, in which the proportions of said enamine compound and said aryl amine are 45 to 75 percent by weight and 20 to 50 percent by weight, respectively.

3. A photosensitive composition as claimed in claim 1, wherein said enamine compound is selected from the group consisting of N-vinylindole, N-vinylpyrrole, N-vinylcarbazole, N-vinylnaphthylamine, N-vinyldiphenylamine, N-vinylpyrrolidone, N-vinyloxazolidone, N-vinylsuccinimide, N-vinylimidazole, N-vinyloxazole, N-vinyloxindol, N-vinylpyrrolidine, N-vinylmorpholine and N-vinylpiperidine.

4. A photosensitive composition as claimed in claim 1, wherein said composition further comprises 4-(p-dimethylaminostyryl)-quinoline as a sensitizer.

* * * * *